(12) United States Patent
Kupka

(10) Patent No.: US 7,055,110 B2
(45) Date of Patent: May 30, 2006

(54) COMMON ON-SCREEN ZONE FOR MENU ACTIVATION AND STROKE INPUT

(76) Inventor: Sig G Kupka, 27319 Julietta La., Los Altos Hills, CA (US) 94022

( * ) Notice: Subject to any disclaimer, the term of this patent is extended or adjusted under 35 U.S.C. 154(b) by 400 days.

(21) Appl. No.: 10/629,052

(22) Filed: Jul. 28, 2003

(65) Prior Publication Data

US 2005/0024239 A1 Feb. 3, 2005

(51) Int. Cl.
*G06F 3/00* (2006.01)
(52) U.S. Cl. ............... 715/863; 715/845; 715/810
(58) Field of Classification Search ........... 715/863, 715/864, 860, 827, 834, 841, 845, 823
See application file for complete search history.

(56) References Cited

U.S. PATENT DOCUMENTS

| | | | |
|---|---|---|---|
| 5,500,935 A * | 3/1996 | Moran et al. ............... 715/863 |
| 5,689,667 A * | 11/1997 | Kurtenbach ................. 715/810 |
| 5,754,176 A * | 5/1998 | Crawford .................... 715/711 |
| 5,778,404 A * | 7/1998 | Capps et al. ................ 715/531 |
| 5,805,167 A * | 9/1998 | van Cruyningen .......... 715/808 |
| 6,094,197 A * | 7/2000 | Buxton et al. .............. 715/863 |
| 6,664,991 B1 * | 12/2003 | Chew et al. ................ 715/863 |
| 6,727,830 B1 | 4/2004 | Lui et al. |
| 6,822,664 B1 * | 11/2004 | Vale ........................... 715/864 |
| 6,904,570 B1 * | 6/2005 | Foote et al. ................ 715/863 |

OTHER PUBLICATIONS

Todd Hodes and Randy Katz, "Enabling 'Smart Spaces:' Entity Description and User Interface Generation for a Heterogeneous Component-Based Distributed System," University of California, Berkeley, Computer Science Division, pp. 1-8, Jul. 17, 1998.

Ben Shneiderman, "Direct Manipulation for Comprehensible, Predictable and Controllable User Interfaces," Institute for Systems Research, Human Computer Interaction Laboratory, Department of Computer Science, 10 pages.

Richard E. Sweet, "The Mesa Programming Environment," Xerox Palo Alto Research Center, ACM 0-89791-165-2/85/006/0216, pp. 216-229, 1985.

Notification of Transmittal of the International Search Report and the Written Opinion, PCT/US04/23448, Nov. 8, 2005, 9 pages.

* cited by examiner

*Primary Examiner*—Sy D. Luu
(74) *Attorney, Agent, or Firm*—Fenwick & West LLP

(57) ABSTRACT

A common on-screen zone provides two or more methods of activating a command. The user can perform a first action, such as a stroke or gesture within the zone to activate a command according to one method, or can perform a second action, such as clicking or pressing a button within the same zone to activate a menu including the same command.

51 Claims, 10 Drawing Sheets

| Delete 103C | Create 103E | End 103H | |
|---|---|---|---|
| Insert 103B | Drag 103J | Shift 103G | Go To 103K |
| Start 103A | Format 103D | Change To 103F | |

FIG. 3A

| Fill color 103A | Zoom 103B | Undo 103C | |
|---|---|---|---|
| Text color 103D | Copy 103J | Transform To 103E | Scroll 103K |
| Border color 103F | Align 103G | Border 103H | |

FIG. 3B

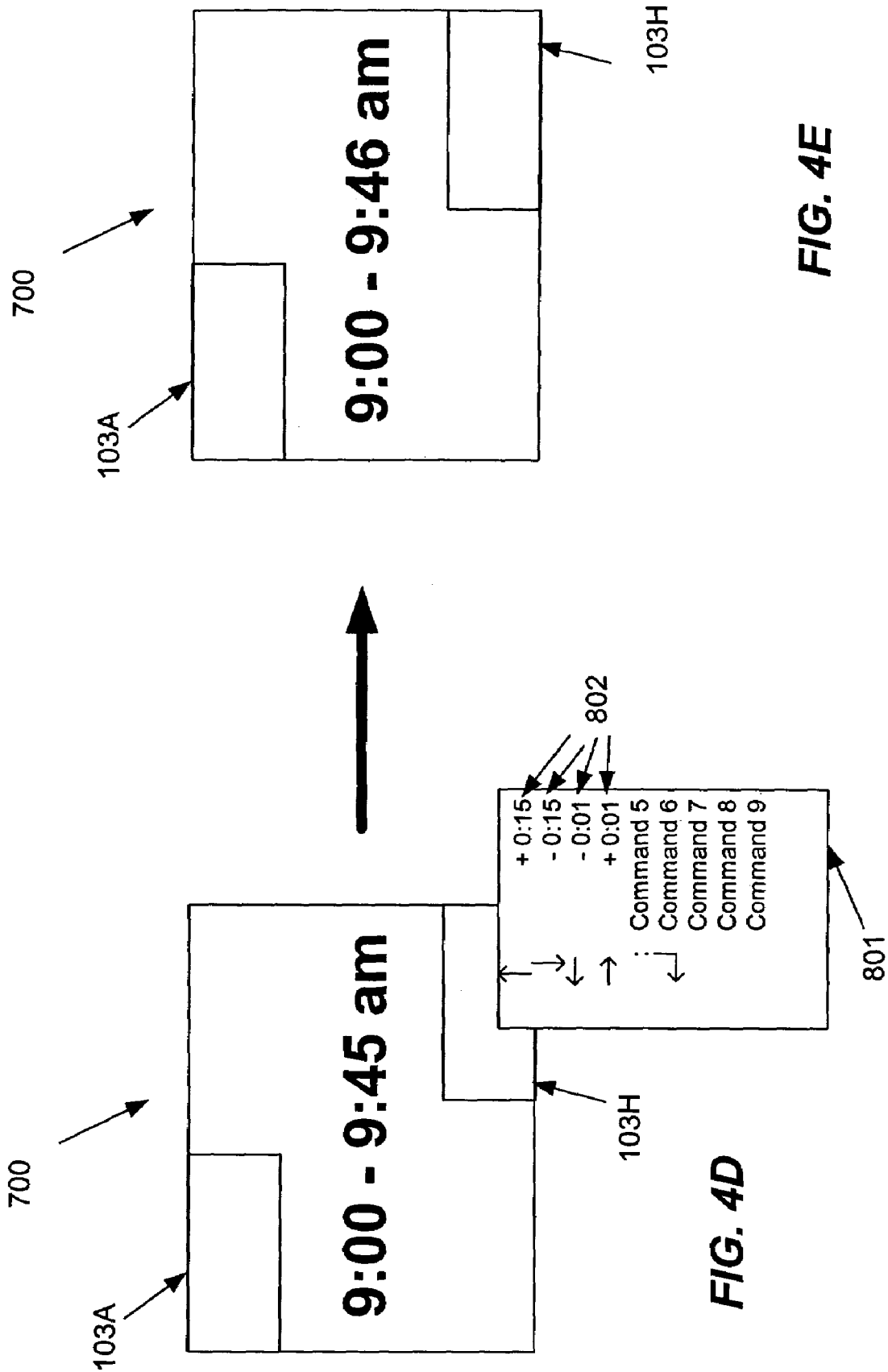

COMMON ON-SCREEN ZONE FOR MENU ACTIVATION AND STROKE INPUT

CROSS-REFERENCE TO RELATED APPLICATION

The present application is related to U.S. Utility patent application Ser. No. 10/629,129 for "Manipulating An On-Screen Object Using Zones Surrounding The Object," filed on the same date as the present application. The disclosure of the related application is incorporated herein by reference.

BACKGROUND OF THE INVENTION

1. Field of the Invention

The present invention relates generally to user interfaces for managing objects, and more particularly to a user interface that includes a common on-screen area, or zone, for both menu activation and stroke input.

2. Description of the Background Art

Existing user interfaces provide many different techniques for moving, altering, controlling, and otherwise manipulating on-screen objects such as windows, images, text blocks, video, and the like. For example, the Windows XP operating system, available from Microsoft Corporation of Redmond, Wash., provides user interface elements for manipulating various types of ington, provides user interface elements for manipulating various types of onscreen objects. Examples of such user interface elements include:

application menus (e.g., click on an object to select it, and select an operation from an application menu);

on-screen buttons (e.g., click on an object to select it, and click a button to perform an operation on the object);

context-sensitive menus (e.g., right-click on an object and select an operation from a pop-up menu);

resize borders or handles (e.g., click-drag a window edge or object handle to resize the window or object); and keyboard commands (e.g., click on an object to select it (or use a keyboard to navigate to an on-screen object), and hit a keystroke to perform an operation on the object).

In addition, some user interfaces (such as the Palm Operating System, available from Palm, Inc.), can accept pen input, such as strokes or gestures, to be interpreted as data and/or commands.

Many elements of conventional user interfaces, including menus, buttons, icons, and pen input zones, operate by receiving user input at particular areas, or zones, of the screen. These types of user interface elements are presented at distinct locations on the screen that are often dedicated to a particular type of input. Thus, to activate a menu the user must click on a menu bar at a particular location on the screen; to activate a button command, the user must click on the button at another location; and to enter stroke or gesture input, the user must provide the input within a pen input zone.

Typically, each of these elements or zones occupies its own space on the screen. Such an approach consumes valuable screen real estate. Furthermore, such an approach can be confusing to users who must become familiar with each of the various input zones and how they are used. In addition, such an approach makes it difficult to establish a visual link between various ways to activate a particular command. For example, a print command can be activated from a menu, or button, or by inputting a stroke command— but there is no visual link between the disparate areas of the screen where each such command input means is located. Furthermore, existing techniques make it difficult to establish a relationship between a particular zone or zones and a particular onscreen object. Thus, an object that currently has focus for purposes of text input, button commands, or menu commands, is not visually linked to or proximate to the zones for these various types of input. The multiplicity of screen regions for activating menus, buttons, and stroke commands makes it difficult to connect, visually, a particular command input zone with the object to which the command will apply.

What is needed, therefore, is a user interface that includes a common zone, or region, for activating commands using two or more input methods or paradigms. What is needed, therefore, is a user interface that includes a common zone for activating a particular command via two or more input methods. What is further needed is a user interface that includes two or more zones, each zone for activating a particular type of command, each zone capable of accepting input via two or more methods for activating commands within the type. What is further needed is a user interface that reduces the amount of screen real estate needed for providing multiple mechanisms for activating commands, and that preserves the ability to relate command input regions to the objects on which the commands will operate. What is further needed is a user interface that accomplishes the above-stated goals in an easy-to-use, intuitive manner.

SUMMARY OF THE INVENTION

In one aspect of the present invention, a user interface includes at least one zone that is capable of accepting command input according to two or more input methods. For example, a user can click on the zone to activate a menu including a number of commands, or the user can perform stroke input on the zone to directly activate a command associated with the stroke input. The user can perform either action in the same zone, or area, of the screen. In one aspect, the directly activatable commands also appear on the menu, so that the user can activate the same command via either method. Thus, the user can click within the zone to activate a command according to a menu, or can perform a stroke or gesture within the same zone to activate the same command directly. In alternative embodiments, other actions than clicking, stroking, or gesturing can be used to activate commands. Also, other command input methods than menus or direct activation can be provided.

In another aspect, multiple command input regions are provided. Each may be associated with a different on-screen object, or with a particular command type. Thus, for example, a Format region might be provided, as well as a Create region. The user can activate commands of the first type (e.g., format commands), by clicking in the first zone to activate a format menu or by performing stroke input in the first zone to directly activate a command. Similarly, the user can activate commands of the second type (e.g. create commands), by clicking in the second zone to activate a region menu or by performing stroke input in the second zone to directly activate a command.

Zones can be provided in consistent locations with respect to the objects to which they relate. As described in related U.S. Utility patent application Ser. No. 10/629,129 for "Manipulating An On-Screen Object Using Zones Surrounding The Object," a control region, including multiple zones, can surround each on-screen object in a consistent manner, so as to provide an easy-to-use mechanism for manipulating different types of objects.

The user specifies commands for manipulating the on-screen object by interacting with the zones. Commands can be activated in different ways, including menu selection, strokes, clicks, button presses, and the like, performed in the area defined by the corresponding zone.

The invention thus provides an easy-to-use mechanism for facilitating multiple input methods, such as menu activation and stroke input, within a common zone or region. The techniques of the present invention preserve screen real estate, operate in an intuitive manner, and are flexible so that they can be applied in a variety of situations and user interfaces. They also make it easier for particular zones to be associated with particular command types and/or objects, so that the user need not learn multiple locations for different ways to activate commands for an object.

BRIEF DESCRIPTION OF THE DRAWINGS

FIGS. 3A and 3B depict examples of command structures for the zones of an object, according to one embodiment.

FIGS. 4D and 4E depict an operation of changing the end time of an object using a menu command.

DETAILED DESCRIPTION OF A PREFERRED EMBODIMENT

The following description of system components and operation is merely exemplary of embodiments of the present invention. One skilled in the art will recognize that the various designs, implementations, and techniques described herein may be used alone or in any combination, and that many modifications and equivalent arrangements can be used. Accordingly, the following description is presented for purposes of illustration, and is not intended to limit the invention to the precise forms disclosed.

The invention may be implemented, for example, on a conventional personal computer running any known operating system, such as Microsoft Windows XP available from Microsoft Corporation of Redmond, Wash. As described below, input to the system of the invention can be provided by any of a number of types of devices, including for example: keyboard, mouse, touchscreen, touchpad, trackball, tablet, microphone, remote control device, and/or the like. As will be seen from the following description, the present invention provides techniques for accepting user inputs from various types of input devices and according to various methods in a consistent and intuitive manner.

One skilled in the art will recognize that the user interface techniques of the present invention may be implemented on devices other than personal computers in which a display is provided to the user. For example, such techniques may be implemented on cell phones, consumer electronic devices, personal digital assistants, office appliances, wall-mounted controllers, automotive control systems, and the like. The description of the invention herein as it might be implemented on a personal computer is not intended to restrict the scope of the present invention or the range of devices on which it can operate.

Furthermore, for illustrative purposes the invention is set forth in terms of menu activation and stroke input in a common zone. However, one skilled in the art will recognize that the techniques of the invention can apply to other types of input elements activatable from a common zone. For example, the invention may apply to input elements that can be activated by gestures, strokes, clicks, double-clicks, button presses, voice activation, and the like.

User Interface Layout

Figure 1:
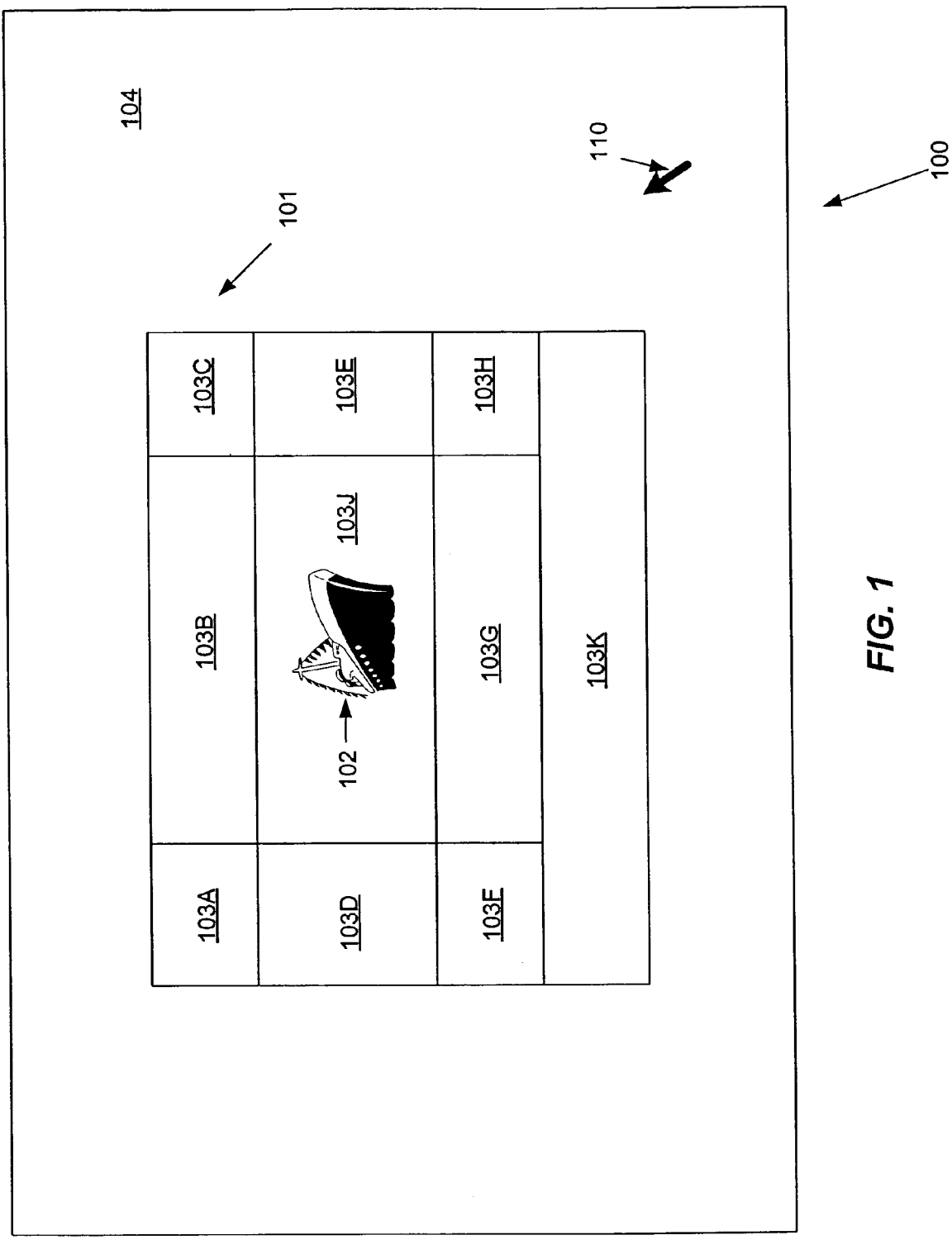
FIG. 1 depicts an example of an on-screen object and a plurality of input zones, according to one embodiment.

Referring now to FIG. 1, there is shown an example of a user interface 100 according to an embodiment of the present invention. User interface 100 may be displayed, for example, on a display screen of a conventional personal computer. Object 102 is an example of an on-screen object displayed within user interface 100. In the example of FIG. 1, object 102 is a graphic object. However, one skilled in the art will recognize that object 102 can be a text object, or a representation of a video or audio object, or any other type of object that can be displayed or represented within the context of user interface 100.

As shown in FIG. 1, according to one embodiment object 102 is surrounded by various zones 103(A–K), referred to collectively as a control region. Each zone 103 provides a designated type of functionality for controlling one or more aspects of object 102, or otherwise manipulating object 102. Object 102, together with the surrounding control region including zones 103, form a window within user interface 100.

The area of user interface 100 surrounding the window is referred to as a "panel" 104. Any number of windows can be presented within panel 104 simultaneously, and these windows can overlap one another, or they can be tiled, minimized, or otherwise manipulated according to known user interface techniques as modified and enhanced by the improvements of the present invention. In one embodiment, only one window is active at any given time, and this is the window for the object that has the focus or that is currently active. The user can cause a window (and its object 102) to be active according to well-known techniques such as: moving a cursor to a window and clicking a button; or using a series of keystrokes or voice commands to select and activate a particular window. In one embodiment, zones 103 are displayed only for the currently active window, and are omitted for all other windows. In another embodiment, zones 103 are displayed for all on-screen windows. In addition, in one embodiment panel 104 itself is treated like any other window, so that it can be activated and zones 103 relevant to the control and manipulation of panel 104 can be displayed. Also shown is cursor 110, which is controlled by the user via a mouse or other pointing device, and can be used to select and activate commands and menus as described below.

Figure 1B:
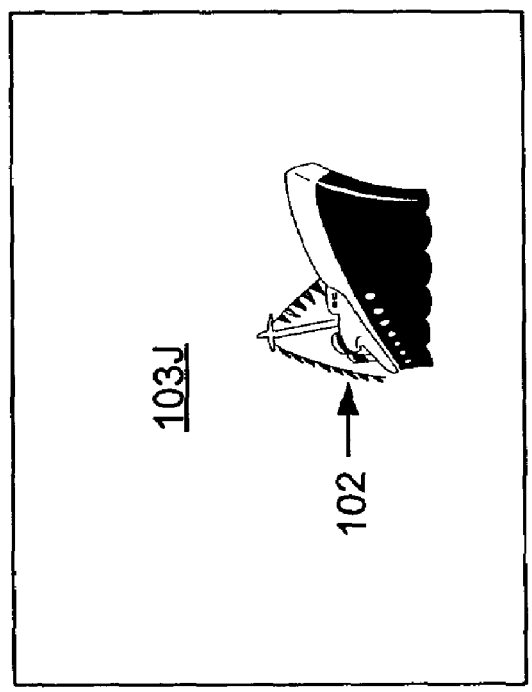
FIG. 1B depicts an example of an implementation of the invention wherein only zone, overlaying the on-screen object, is included.
Figure 1A:
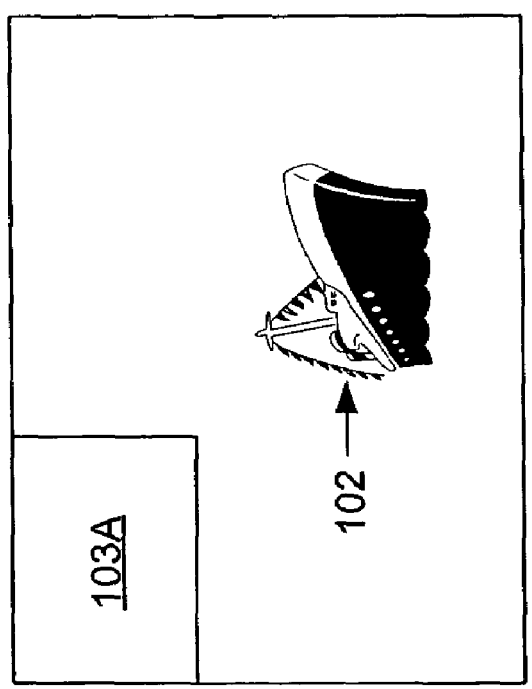
FIG. 1A depicts an example of an implementation of the invention wherein only zone is included.

In the example of FIG. 1, ten zones 103A through 103K are shown, including zone 103J that overlays object 102, and zone 103K that is located outside control region 101. Zone 103K is depicted in the drawings as extending along the bottom of region 101, but in one embodiment includes all areas not within region 101. One skilled in the art will recognize that any number of zones could be included, and that the particular arrangement of zones 103 shown in FIG. 1 is merely exemplary. In one embodiment, only one zone 103 operates as described herein. Referring momentarily to FIG. 1A, there is shown an example wherein only zone 103A is included. Referring momentarily to FIG. 1B, there is shown an example wherein only zone 103J, representing the area overlaying object 102 itself, is included. Either of these examples, or other arrangements including one or more zones 103, can be used. Thus, any subset of zones 103 shown in FIG. 1 can be omitted without departing from the essential characteristics of the present invention. In addition, the invention may be implemented in a zone having no visible bounds, or having bounds that are coextensive with another on-screen element such as an object.

Input Mechanisms

In operation, the device on which the user interface 100 operates detects user commands with respect to the various zones 103 of an onscreen object 102. For example, a user may use a mouse or other input device to move an onscreen cursor 110 to a zone 103. The user may then perform an action, such as clicking a button on a mouse, to activate a command or operation associated with the zone 103. As will be described in more detail below, some zones 103 may have different commands or operations associated with different user actions; for example, a user may click a left button to activate a first command, or a right button to activate a second command. Other possible actions associated with different types of commands include: "stroking" within a zone 103 by holding down a button and moving the cursor 110 a short distance in a particular direction; "shift-clicking" within a zone 103 by holding down a shift key (or other modifier key) while clicking within the zone 103; or double- or triple-clicking within a zone 103.

Thus, within a particular zone 103, a click might activate a menu, a shift-click might activate an alternate menu, and a stroke might activate a particular command. In one embodiment, the stroke command corresponds to one of the commands in the menu or alternate menu, thus providing the user with two (or more) ways to initiate the same command (i.e. via the menu or via a stroke).

User Actions

Figure 2:
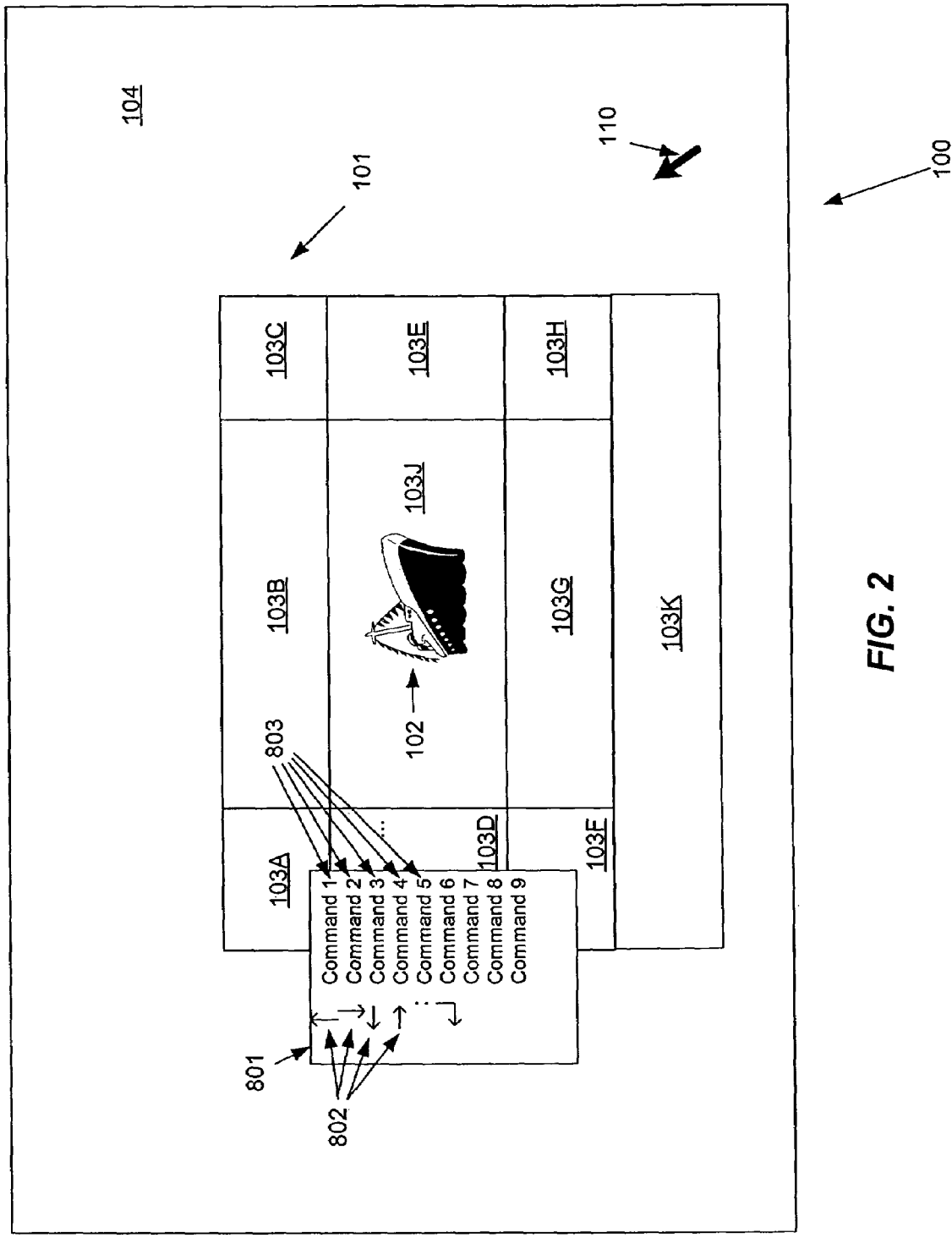
FIG. 2 depicts an example of a menu associated with a zone, according to one embodiment of the invention.

Many different command sets are possible. In one embodiment, the user can perform the following user input actions to activate commands:

Click standard button (e.g. left-click) while cursor 110 is in zone 103 (or, for pen input, touch zone 103 without pressing pen button): activates a pop-up menu, which may be also called a primary menu, containing commands for zone 103. The displayed pop-up menu shows the relevant commands for the zone 103, and allows the user to navigate and select one of the displayed commands using known menu navigation techniques. In one embodiment, each pop-up menu for each zone 103 is associated with a particular theme or general type of action, or group of associated actions. For example, a zone 103 may have a variety of commands or actions related to font characteristics; another zone 103 may have a variety of commands related to paragraph characteristics, and so forth. In one embodiment, included in the pop-up menu are commands that can be invoked by movement of the input device by a stroke in a predetermined direction (e.g., up, down, left, or right). FIG. 2 illustrates a pop-up menu 801 showing four stroke icons 802, each stroke direction corresponding to a particular command. Also included is a command that corresponds to a double-click for zone 103. One skilled in the art will recognize that the menu can include commands for any other type of action or gesture that can be performed within zone 103, and may also include commands that cannot be activated directly using an action or a gesture. FIG. 2 depicts an example of such a menu 801, including commands 803 and icons 802 indicating corresponding stroke directions, and commands 803 having icons 802 indicating other actions such as a double-click and an Enter key.

Click alternate button (e.g. right-click), or modified button (e.g. shift-click), or click and hold button while cursor 110 is in zone 103 (or, for pen input, either touch zone 103 with pen button pressed, or touch and hold the pen in zone 103): activates an alternate pop-up menu, which may also be called a secondary menu. The alternate pop-up menu operates in a similar manner as the first pop-up menu 801, and also includes icons or indicators showing direct actions that correspond to stroke directions, double-click, and the like, where applicable. In one embodiment, the on-screen cursor 110 changes to indicate that the button has been held long enough to activate the alternate menu.

Stroke (i.e., hold down button and move cursor 110 a short distance in a particular direction) starting in zone 103 (or, for pen input, stroke without pressing pen button): performs an action associated with the particular stroke direction. Strokes can be of any type, including straight lines, curves, or more complex shapes or gestures. In one embodiment, as described herein, strokes are associated with particular directions (up, down, left, or right), although one skilled in the art will recognize that other types of strokes may also be used. As described above, in one embodiment, the pop-up menu 801 for a zone 103 includes each of the stroke directions and indicates what command is associated with each stroke direction. Thus, the user can activate any of these actions by performing the stroke input or by clicking and then selecting the desired item from the pop-up menu 801. Longer strokes can be associated with a click-and-drag action.

Double-click (or other action) in zone 103: performs an associated command. As described above, in one embodiment, the pop-up menu 801 for a zone 103 indicates what command is associated with double-clicking (or other actions). Thus, the user can activate the command by double-clicking or by clicking and then selecting the desired item from the pop-up menu 801.

Alternate stroke (i.e., hold down alternate button (right button), or modified button (shift-stroke), and move cursor 110 a short distance in a particular direction) starting in zone 103 (or, for pen input, stroke while pressing pen button, or hold pen in place for a moment and then stroke): performs an alternate command associated with the particular stroke direction (up, down, left, or right). As described above, in one embodiment, the alternate pop-up menu for a zone 103 includes each of the stroke directions and indicates what alternate action is associated with each stroke direction. In one embodiment, the on-screen cursor 110 changes when the modifier key is pressed, to remind the user that the alternate command will be performed.

Alternate double-click (i.e., hold down alternate button (right button), or modified button (shift-stroke), and double-click) in zone 103: performs an associated command. As described above, in one embodiment, the pop-up menu 801 for a zone 103 indicates what command is associated with alternate double-clicking (or other actions). Thus, the user can activate the command by alternate double-clicking or by clicking and then selecting the desired item from the pop-up menu 801.

Alternate menus, stroke commands, double-clicks, and the like can be activated in a number of different ways, depending on the input device. For two-button devices, the alternate button can be used to activate the alternate commands. For one-button devices, the alternate menus and strokes can be activated by pressing and holding the button down for a moment without movement. In one embodiment, the on-screen cursor 110 changes to indicate when the alternate action will be performed. A mechanism for keyboard activation of commands is described in more detail below.

Examples of Command Structures

Referring now to FIGS. 3A and 3B, there are shown examples of command structures according to one embodiment, based on the zone layout shown in FIG. 1. FIG. 3A depicts command types corresponding to primary menus, and FIG. 3B depicts command types corresponding to secondary, or alternate, menus.

In general, each zone 103 is associated with a number of actions that are related to a particular function or type, as set forth below. Although these actions are in general consistent among object types, some actions may be object-specific and/or inapplicable to certain types of objects.

In addition to the most commonly used actions that are generally accessible via a primary menu 801, each zone 103 is also associated with an alternate action or set of actions. For example, an alternate menu may be accessed by right-clicking or option-clicking a mouse, or by pressing a shift key prior to pressing a zone 103 activation key. Alternate keystrokes can be accessed by stroking while holding down a right mouse button, or a modifier key such as shift or option. Other techniques may also be used for accessing alternate actions.

Wherever possible, each zone provides unified, consistent access to a group of commands that related to a particular theme. The input actions of clicking, click-and-hold, or stroking provide various ways to access commands within the group. According to one embodiment of the present invention, the user can activate a command by selecting the command from a menu associated with a particular zone 103, and he or she can directly activate the same command directly from the same zone 103 by performing a stroke or other gesture within the zone 103.

Figure 4A:
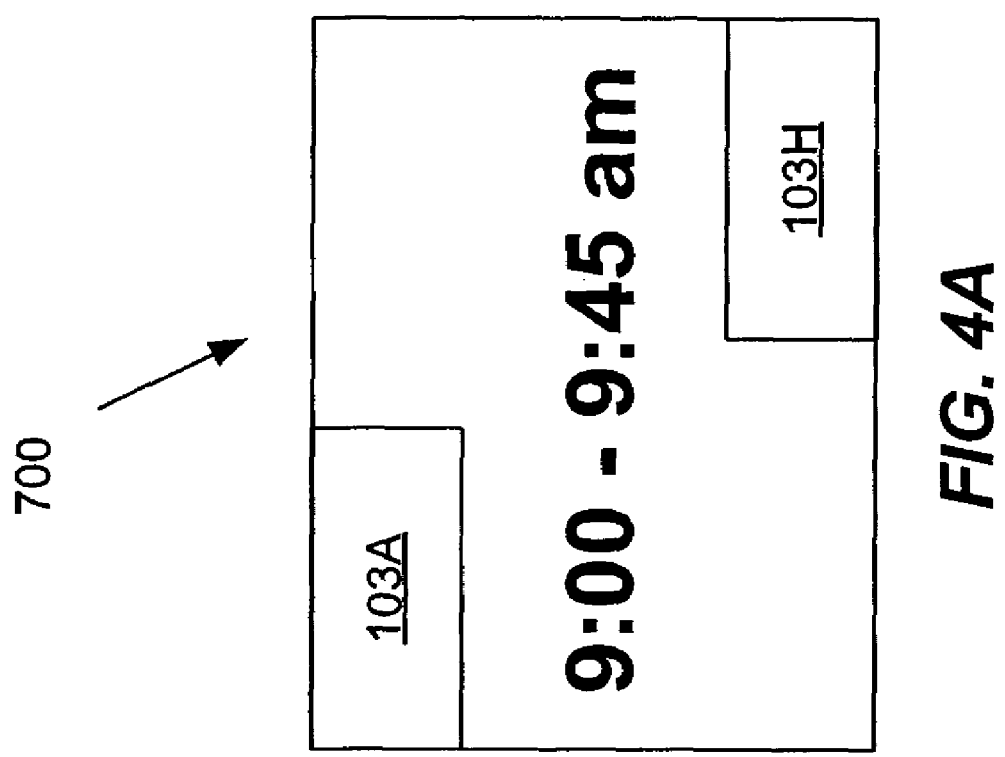
FIG. 4A depicts an example of a time duration object including a start zone and an end zone, according to one embodiment.

Referring now to FIGS. 4A through 4E, there is shown an example of activation of a command via these two methods. FIG. 4A depicts a particular type of object (an input field 700 for controlling a time), as may be included for example in a calendaring program for maintaining information about appointments and reminders. For illustrative purposes, input field 700 includes two input zones (start zone 103A and end zone 103H), although fewer or more zones 103 could be provided. Input field 700 is an object that has two primary purposes: 1) to display a representation of a time period; and 2) to accept user input for changing the time period and/or the manner in which it is displayed.

FIG. 4A depicts input field 700 having a value of 9:00–9:45 am. Input field 700 includes start zone 103A for changing the start time of the appointment, and end zone 103H for changing the end time. Zones 103A and 103H may be displayed with an outline, text label, distinct color, icon, or other indicator or any combination thereof. Alternatively, zones 103A and 103H may contain no visible demarcations.

In one embodiment, zone 103A allows the user to change the start of the time period, and zone 103H allows the user to change the end time. Changes can be made by stroking within the zone 103A or 103H, or by selecting a menu for zone 103A or 103H and selecting the desired command from the menu. According to the techniques of the present invention, the same zone 103A or 103H is used for both types of input method.

When using direct stroke input, stroking in different directions causes different commands to be initiated. For example, for zone 103A, vertical strokes would cause coarse adjustments to the start point to be made (e.g., changing by 15 minutes), while horizontal strokes would cause fine adjustments to be made (e.g., changing by one minute). Alternatively, vertical strokes might change the value by a one-hour increment (or some other relatively coarse increment), while horizontal strokes might change the value by a one-minute increment (or some other relatively fine increment). In general, strokes in the up and left directions move the start point earlier, while strokes in the down and right directions move the start point later. The particular increments and directions of movement can be preset, or can be user-configurable via a preferences or options screen. Similarly, for zone 103H, vertical strokes indicate coarse changes to the end time, while horizontal strokes indicate fine changes.

In one embodiment, the time period adjustment is repeated if the user holds the stylus or other pointing device in position at the end of the stroke; in another embodiment, the time period adjustment is repeated if the user continues to stroke in the same direction (if desired, a wait period can be implemented before the repetition commences, as is conventionally done in autorepeat modes for keyboards). The time period adjustment repetition can be set to accelerate if the user continues to hold for a predetermined period of time. In one embodiment, the user can "back up" if the time period adjustment goes to far. The display of input field 700 is continually adjusted so that the user can see the time period adjustments in real-time and release or backtrack at precisely the correct moment.

Figure 4C:
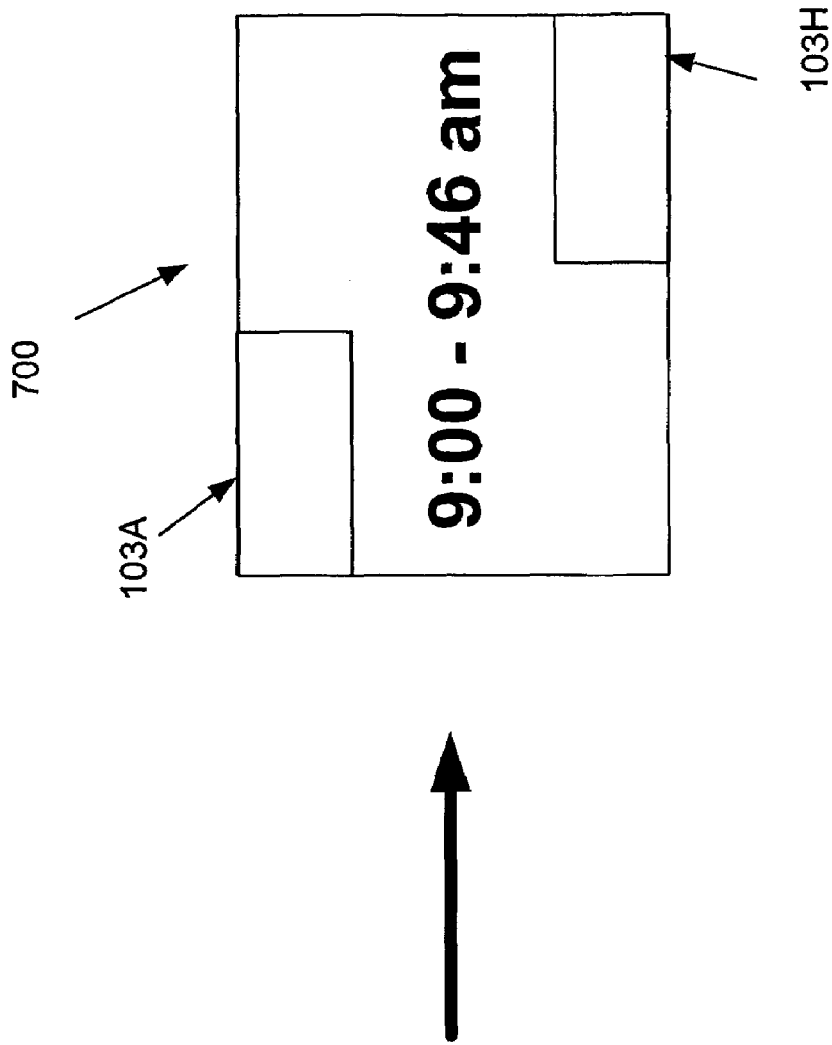
FIGS. 4B and 4C depict an operation of changing the end time of an object using a stroke command.
Figure 4B:
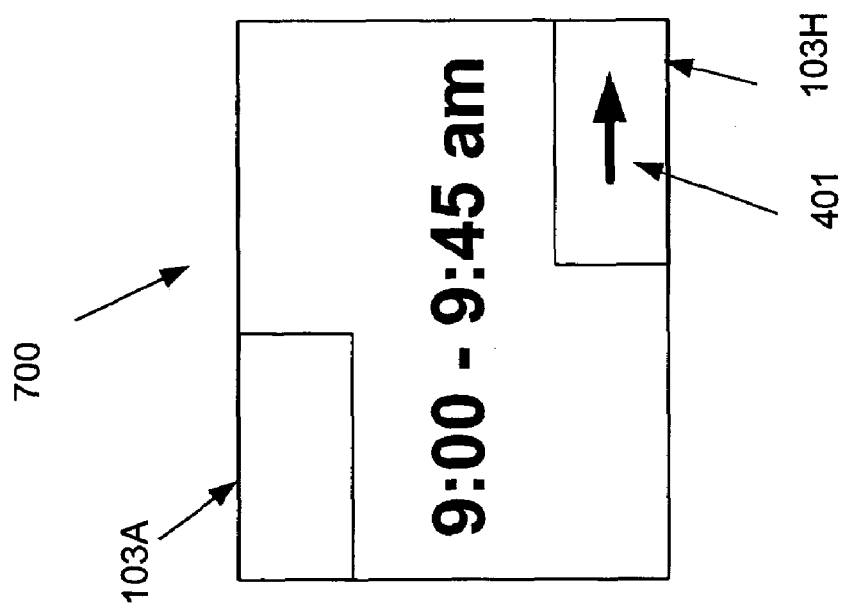

Referring now to FIGS. 4B and 4C, there is shown an example of changing the end time of the time period via direct stroke input. In FIG. 4B, the user performs a horizontal stroke 401 within zone 103H, indicating that he or she wishes to perform fine adjustment to the time period. Stroke 401 is shown in FIG. 4B for illustrative purposes to represent the user's action. The arrow representing stroke 401 may be momentarily displayed to provide visual feedback of the user input, or it can be omitted. Other forms of feedback may be provided, such as visual or auditory indication that a command has been received.

FIG. 4C depicts input field 700 after time period has been adjusted in response to the user's command. The user indicated a fine adjustment of the end time; accordingly, the end time of the appointment has been adjusted from 9:45 to 9:46.

Referring now to FIGS. 4D and 4E, there is shown an example of changing the end time of the time period using a menu command. In FIG. 4D, the user clicks within zone 103H to activate menu 801. Menu 801 includes commands 802 for changing the end time by coarse and fine increments. Commands 802 correspond to stroke commands available within zone 103H, such as up, down, left, and right. Menu 801 may also include additional commands that do not correspond to stroke commands.

The user selects a command 802. Menu 801 is dismissed, and the command is executed. In FIG. 4E, input field 700 is shown after the user has selected the command 802 for changing the end time by a fine increment (one minute). Accordingly, the end time of the appointment has been adjusted from 9:45 to 9:46.

FIGS. 4D and 4E thus depict an example of executing a time adjustment command that has the same effect as the direct stroke command of FIGS. 4B and 4C. According to the techniques of the invention, both the direct stroke method and the menu method are associated with a particular input zone 103H. In this case, the particular input zone 103H is dedicated to adjusting the end time of input field 700.

Figure 5:
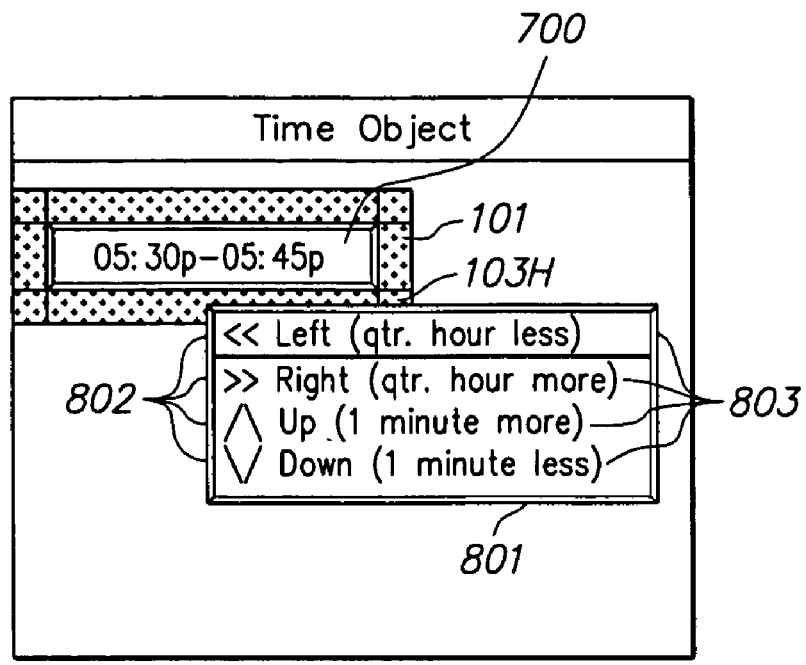
FIG. 5 is a screen shot depicting an example of a menu for an input field.

Referring now to FIG. 5, there is shown a screen shot depicting an example of a menu 801 for an input field 700. Menu 801 is activated by clicking on the lower right zone 103H of control region 101. Input field 700 contains the value "05:30p–05:45p." Menu 801 includes commands 803 for changing the end time by various increments. Icons 802 indicate stroke directions corresponding to commands 803. In the example, horizontal strokes are used for coarse adjustments (by quarter-hour increments), and vertical strokes are used for fine adjustments (by one-minute increments).

Figure 6A:
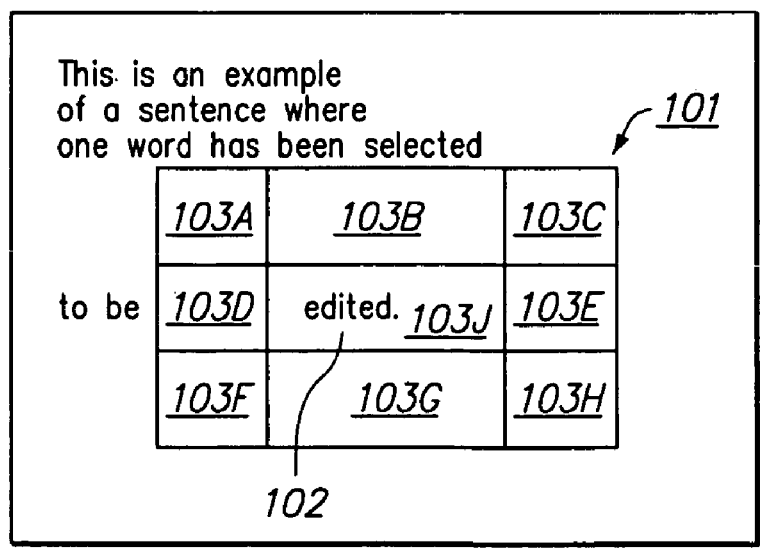
FIG. 6A depicts an example of a control region for a text object.

Referring now to FIG. 6A, there is shown an example of a control region 101 for a text object 102. Text object 102 is a word within a sentence. Control region 101 includes zones 103A through 103J as described above.

Figure 6B:
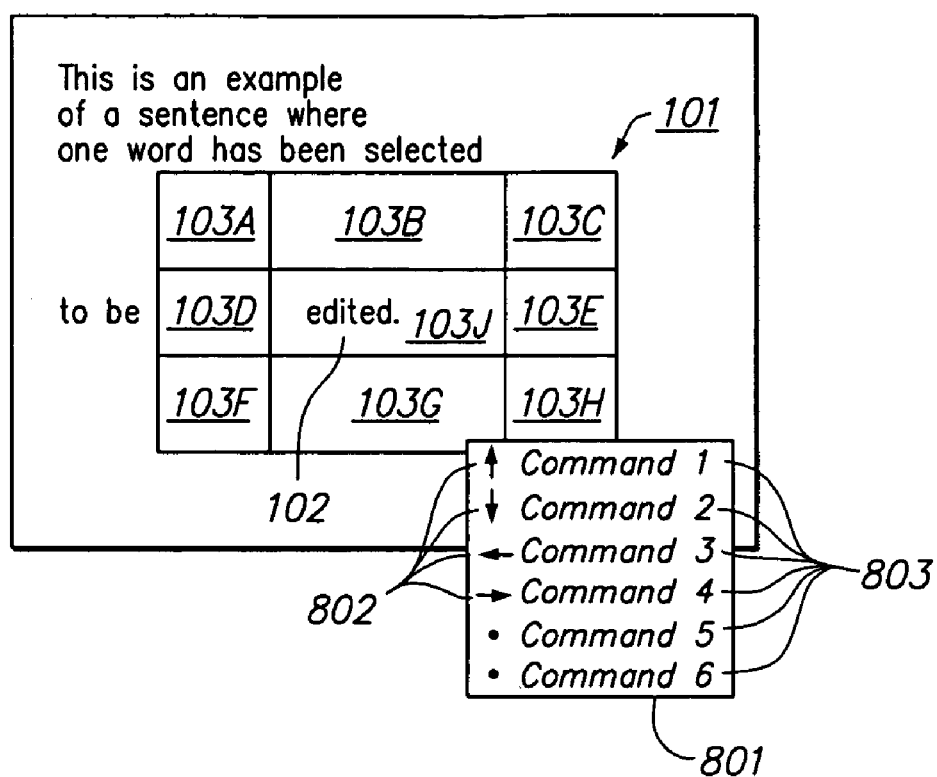
FIG. 6B depicts an example of a control region for a text object, wherein a menu has been activated.

Referring now to FIG. 6B, there is shown an example of a control region 101 for a text object 102, wherein menu 801 has been activated. Menu 801 includes commands 803 and icons 802 indicating corresponding stroke directions.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A computer-implemented input method for a user interface, the user interface including a zone occupying less than the entire user interface, the method comprising:
    responsive to a user input anywhere in the zone being stroke input, performing a command associated with the user input; and
    responsive to the user input anywhere in the same zone being a menu activation command, displaying a menu including a plurality of commands.

2. The method of claim 1, wherein the zone is associated with an object, and wherein performing a command comprises manipulating the object.

3. The method of claim 1, wherein the zone is adjacent to an object.

4. The method of claim 1, wherein the menu activation command comprises pressing a button.

5. The method of claim 1, wherein the menu comprises at least one command associated with stroke input.

6. The method of claim 5, wherein the menu comprises, for each command associated with stroke input, an icon indicating the associated stroke input.

7. The method of claim 1, wherein the zone comprises a portion of a window associated with an object.

8. The method of claim 1, further comprising, responsive to the user input in the zone being a menu activation command:
receiving a selection of a command from the menu; and
performing the selected command.

9. The method of claim 1, wherein the user interface includes a plurality of zones, each zone corresponding to a type of command, and wherein the command associated with the user input and the commands in the menu belong to the type.

10. The method of claim 1, wherein the user interface includes a plurality of zones surrounding an object, and wherein performing the command comprises performing the command on the object.

11. The method of claim 10, wherein performing the command on the object comprises changing a characteristic of the object.

12. The method of claim 11, wherein changing the characteristic of the object comprises:
responsive to the stroke input being along a first axis, changing the characteristic of the object by a first increment; and
responsive to the stroke input being along a second axis, changing the characteristic of the object by a second increment different from the first increment.

13. The method of claim 12, wherein the second increment is of smaller magnitude than the first increment.

14. The method of claim 12, wherein the menu comprises commands for changing the characteristic of the object by the first and second increment.

15. The method of claim 12, wherein the second axis is perpendicular to the first axis.

16. The method of claim 15, wherein one axis is vertical, and the other axis is horizontal.

17. The method of claim 12, wherein the characteristic of the object is one selected from the group consisting of:
a start position;
an end position;
a duration;
a size;
a length;
a date;
a time;
a numeric value;
a width;
a height;
an image cropping specification;
a thickness;
a decimal place location;
playing speed;
playing position;
a leading character;
a terminating character;
a location;
an alignment;
a rotation;
a font;
a style;
a capitalization;
a color;
an opacity;
a brightness; and
a relative volume.

18. A system for accepting user input for performing a command, the system comprising:
a display device, for displaying a user interface including a zone occupying less than the entire user interface;
an input device, for accepting using input in the zone; and
a processor, coupled to the display and the input device, for:
responsive to a user input anywhere in the zone being stroke input, performing a command associated with the user input; and
responsive to the user input anywhere in the same zone being a menu activation command, causing the display device to display a menu including a plurality of commands.

19. The system of claim 18, wherein the zone is associated with an object, and wherein performing a command comprises manipulating the object.

20. The system of claim 18, wherein the display device displays an object, and wherein the zone is displayed adjacent to the object.

21. The system of claim 18, wherein user input comprises the menu activation command comprises pressing a button on the input device.

22. The system of claim 18, wherein the menu comprises at least one command associated with stroke input.

23. The system of claim 22, wherein the menu comprises, for each command associated with stroke input, an icon indicating the associated stroke input.

24. The system of claim 18, wherein the display device displays a window associated with an object, and wherein the zone comprises a portion of the window.

25. The system of claim 18, wherein, responsive to the user input in the zone being a menu activation command:
the input device receives input representing a selection of a command from the menu; and
the processor performs the selected command.

26. The system of claim 18, wherein the user interface includes a plurality of zones, each zone corresponding to a type of command, and wherein the command associated with the user input and the commands in the menu belong to the type.

27. The system of claim 18, wherein the user interface includes a plurality of zones surrounding an object, and wherein the processor performs the command by performing the command on the object.

28. The system of claim 27, wherein the processor performs the command on the object by changing a characteristic of the object.

29. The system of claim 28, wherein the processor changes a characteristic of the object by:
responsive to the stroke input being along a first axis, changing the characteristic of the object by a first increment; and
responsive to the stroke input being along a second axis, changing the characteristic of the object by a second increment different from the first increment.

30. The system of claim 29, wherein the second increment is of smaller magnitude than the first increment.

31. The system of claim 29, wherein the menu comprises commands for changing the characteristic of the object by the first and second increment.

32. The system of claim 29, wherein the second axis is perpendicular to the first axis.

33. The system of claim 32, wherein one axis is vertical, and the other axis is horizontal.

34. The system of claim 29, wherein the characteristic of the object is one selected from the group consisting of:
   a start position;
   an end position;
   a duration;
   a size;
   a length;
   a date;
   a time;
   a numeric value;
   a width;
   a height;
   an image cropping specification;
   a thickness;
   a decimal place location;
   playing speed;
   playing position;
   a leading character;
   a terminating character;
   a location;
   an alignment;
   a rotation;
   a font;
   a style;
   a capitalization;
   a color;
   an opacity;
   a brightness; and
   a relative volume.

35. A computer program product for accepting input in a user interface, the user interface including a zone occupying less than the entire user interface, the computer program product comprising:
   a computer-readable medium; and
   computer program code, encoded on the medium, for:
      responsive to a user input anywhere in the zone being stroke input, performing a command associated with the user input; and
      responsive to the user input anywhere in the same zone being a menu activation command, displaying a menu including a plurality of commands.

36. The computer program product of claim 35, wherein the zone is associated with an object, and wherein the computer program code for performing a command comprises computer program code for manipulating the object.

37. The computer program product of claim 35, wherein the zone is adjacent to an object.

38. The computer program product of claim 35, wherein the menu activation command comprises pressing a button.

39. The computer program product of claim 35, wherein the menu comprises at least one command associated with stroke input.

40. The computer program product of claim 39, wherein the menu comprises, for each command associated with stroke input, an icon indicating the associated stroke input.

41. The computer program product of claim 35, wherein the zone comprises a portion of a window associated with an object.

42. The computer program product of claim 35, further comprising computer program code for, responsive to the user input in the zone being a menu activation command:
   receiving a selection of a command from the menu; and
   performing the selected command.

43. The computer program product of claim 35, wherein the user interface includes a plurality of zones, each zone corresponding to a type of command, and wherein the command associated with the user input and the commands in the menu belong to the type.

44. The computer program product of claim 35, wherein the user interface includes a plurality of zones surrounding an object, and wherein the computer program code for performing the command comprises computer program code for performing the command on the object.

45. The computer program product of claim 44, wherein the computer program code for performing the command on the object comprises computer program code for changing a characteristic of the object.

46. The computer program product of claim 45, wherein the computer program code for changing the characteristic of the object comprises computer program code for:
   responsive to the stroke input being along a first axis, changing the characteristic of the object by a first increment; and
   responsive to the stroke input being along a second axis, changing the characteristic of the object by a second increment different from the first increment.

47. The computer program product of claim 46, wherein the second increment is of smaller magnitude than the first increment.

48. The computer program product of claim 46, wherein the menu comprises commands for changing the characteristic of the object by the first and second increment.

49. The computer program product of claim 46, wherein the second axis is perpendicular to the first axis.

50. The computer program product of claim 49, wherein one axis is vertical, and the other axis is horizontal.

51. The computer program product of claim 46, wherein the characteristic of the object is one selected from the group consisting of:
   a start position;
   an end position;
   a duration;
   a size;
   a length;
   a date;
   a time;
   a numeric value;
   a width;
   a height;
   an image cropping specification;
   a thickness;
   a decimal place location;
   playing speed;
   playing position;
   a leading character;
   a terminating character;
   a location;
   an alignment;
   a rotation;
   a font;
   a style;
   a capitalization;
   a color;
   an opacity;
   a brightness; and
   a relative volume.

* * * * *

UNITED STATES PATENT AND TRADEMARK OFFICE
CERTIFICATE OF CORRECTION

| | |
|---|---|
| PATENT NO. | : 7,055,110 B2 |
| APPLICATION NO. | : 10/629052 |
| DATED | : May 30, 2006 |
| INVENTOR(S) | : Sig G. Kupka |

It is certified that error appears in the above-identified patent and that said Letters Patent is hereby corrected as shown below:

Column 1, line 27, please delete line 27 entirely.

Column 1, line 28, please delete the words "elements for".

Signed and Sealed this

Twenty-fourth Day of October, 2006

JON W. DUDAS
*Director of the United States Patent and Trademark Office*